(12) United States Patent
Choi et al.

(10) Patent No.: US 10,250,820 B2
(45) Date of Patent: Apr. 2, 2019

(54) ELECTRONIC DEVICE AND METHOD FOR CONTROLLING THE ELECTRONIC DEVICE

(71) Applicant: Samsung Electronics Co., Ltd., Gyeonggi-do (KR)

(72) Inventors: Hong-Suk Choi, Gyeonggi-do (KR); Jung-Hoon Kim, Seoul (KR); Ki-Huk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/497,576

(22) Filed: Apr. 26, 2017

(65) Prior Publication Data

US 2017/0324909 A1 Nov. 9, 2017

(30) Foreign Application Priority Data

May 4, 2016 (KR) .................. 10-2016-0055631

(51) Int. Cl.
*H04N 5/265* (2006.01)
*G06T 7/11* (2017.01)
*H04N 5/225* (2006.01)

(52) U.S. Cl.
CPC .............. *H04N 5/265* (2013.01); *G06T 7/11* (2017.01); *H04N 5/2256* (2013.01); *G06T 2207/10016* (2013.01)

(58) Field of Classification Search
CPC ........ H04N 5/265; H04N 5/2256; G06T 7/11; G06T 2207/10016
See application file for complete search history.

(56) References Cited

U.S. PATENT DOCUMENTS

2015/0227025 A1 8/2015 Park et al.
2016/0150165 A1* 5/2016 Grauer .............. H01L 27/14621
348/280

FOREIGN PATENT DOCUMENTS

KR  10-1421963 B1  7/2014
KR  10-2015-0094934 A  8/2015

\* cited by examiner

*Primary Examiner* — Padma Haliyur
(74) *Attorney, Agent, or Firm* — Cha & Reiter, LLC.

(57) ABSTRACT

An electronic device and a method for controlling thereof are provided. The device includes a light emitter, an image sensor including first pixels controlled based on a first parameter and second pixels controlled based on a second parameter, a sensor, and a processor. The processor detects a first object and a second object in an image area, determines the first and second parameters based on a first property of the first object and a second property of the second object, said determination is based on a light intensity that is outputted from the light emitter and reflected by the first and second objects, acquires a first image of the first object according to the first parameter and a second image of the second object according to the second parameter, and synthesizes a first area corresponding to the first object with a second area corresponding to the second object.

19 Claims, 10 Drawing Sheets

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 2 | 2 | 2 | 2 | 1 | 1 |
| 1 | 1 | 2 | 3 | 3 | 2 | 1 | 1 |
| 1 | 1 | 2 | 3 | 3 | 2 | 1 | 1 |
| 1 | 1 | 2 | 2 | 2 | 2 | 1 | 1 |
| 1 | 1 | 1 | 1 | 1 | 1 | 1 | 1 |
| 1 | 1 | 1 | 1 | 1 | 1 | 1 | 1 |

FIG.8A

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG.8B

ELECTRONIC DEVICE AND METHOD FOR CONTROLLING THE ELECTRONIC DEVICE

CLAIM OF PRIORITY

This application claims the benefit under 35 U.S.C. § 119(a) of a Korean patent application filed in the Korean Intellectual Property Office on May 4, 2016 and assigned Serial No. 10-2016-0055631, the entire disclosure of which is incorporated herein by reference.

TECHNICAL FIELD

The present disclosure relates to an electronic device, and more particularly, to a method for processing a high dynamic range (HDR) image using the electronic device.

BACKGROUND

The dynamic range of an image is a range of the luminance of the darkest area to the luminance of the brightest area in the image, defined as a ratio between the brightest pixel value and the darkest pixel value. The dynamic range is controlled by adjusting pixel brightness, such as adjusting the luminance of the image. A technique of improving image quality by improving the dynamic range of an image output from an image sensor is called high dynamic range (HDR) imaging.

In HDR imaging, images with different exposure are acquired by capturing the same object two or more times. These images of different exposures are then synthesized into a single output image, thereby increasing the dynamic range with rich gradation of light in the output image. A plurality of images having different exposures may be acquired by differentiating the exposure, i.e. changing the shutter speeds used for the acquisition of the images.

Further, flash lighting may be used in low-illuminance photographing such as photographing at night. When using the flash that may operate in a pre-flash mode, with the intensities of light fixed for the pre-flash and the main flash, a final image may be acquired by using the light emitted from the pre-flash and flash.

Conventionally, when flashes are used for low-illuminance photographing, the amount of light emitted from the flash depends on the light required to illuminate a main object, which may result in a dark background.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide an electronic device and a method for controlling the electronic device, in which a short-exposed image and a long-exposed image are captured simultaneously by controlling light emission amounts adaptively according to a main object and a sub-object through the pre-flash operation of a flash during low-illuminance photographing, so that an image having proper exposure for both foreground and background is acquired by synthesizing the captured images.

In accordance with an aspect of the present disclosure, there is provided an electronic device. The electronic device includes a light emitter, an image sensor including a plurality of first pixels controlled based on a first parameter, and a plurality of second pixels controlled based on a second parameter, at least one sensor, and a processor. The processor is configured to detect a first object and a second object among a plurality of objects in an image area, determine the first parameter based on a first property of the first object and the second parameter based on a second property of the second object, said determination is based at least in part on a light intensity that is outputted from the light emitter, reflected by the first object and the second object, and detected by the image sensor or the at least one sensor, acquire a first image of the first object according to the first parameter using the plurality of first pixels and a second image of the second object according to the second parameter using the plurality of second pixels; and synthesize a first area corresponding to the first object in the first image with a second area corresponding to the second object in the second image to generate an output image.

In accordance with another aspect of the present disclosure, there is provided an electronic device. The electronic device includes a light emitter, an image sensor for acquiring image data through a plurality of first pixels and a plurality of second pixels, and a processor configured to identify a property of at least one object using light from the light emitter, determine a parameter for the at least one object based at least in part on the property, acquiring a plurality of image data corresponding to the at least one object through the first pixels and the second pixels, based on the determined parameter, and synthesizing the acquired plurality of image data to generate an output image.

In accordance with another aspect of the present disclosure, there is provided a method for controlling an electronic device. The method includes identifying a property of at least one object using light from a light emitter of the electronic device; determining a parameter for the at least one object based at least in part on the property; acquiring a plurality of image data corresponding to the at least one object through an image sensor including a plurality of first pixels and a plurality of second pixels, based on the determined parameter; and synthesizing the acquired plurality of image data to generate an output image.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 8A and FIG. 8B are exemplary views illustrating automatic exposure (AE) metering results in an electronic device according to one embodiment of the present disclosure;

Throughout the drawings, like reference numerals will be understood to refer to like parts, components, and structures.

DETAILED DESCRIPTION

Figure 1:
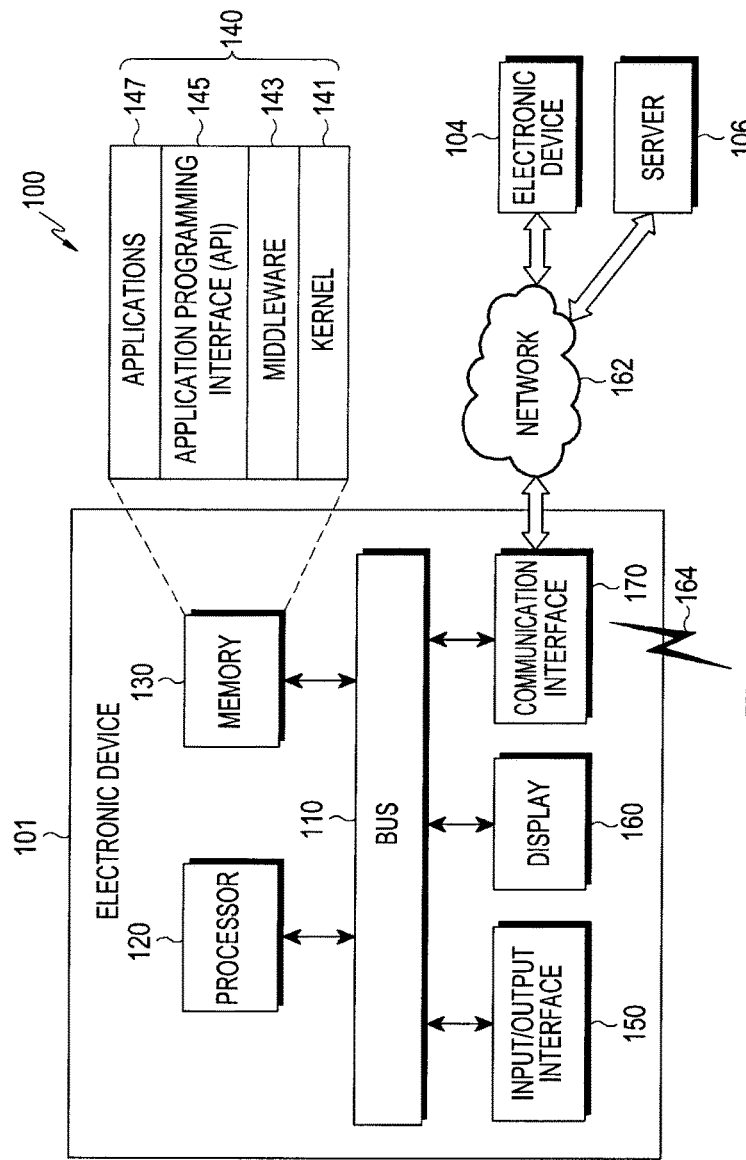
FIG. 1 is a block diagram of an electronic device in a network environment according to one embodiment of the present disclosure.

Various embodiments of the present disclosure are described with reference to the accompanying drawings. However, the scope of the present disclosure is not intended to be limited to the particular embodiments and it is to be understood that the present disclosure covers various modifications, equivalents, and/or alternatives falling within the scope and spirit of the present disclosure. In relation to a description of the drawings, like reference numerals denote the same components.

In the present disclosure, the term "have," "may have," "include," or "may include" signifies the presence of a specific feature (for example, number, function, operation, or component such as part), not excluding the presence of one or more other features.

In the present disclosure, the term "A or B," "at least one of A or/and B," or "one or more of A or/and B" may cover all possible combinations of enumerated items. For example, "A or B," "at least one of A and B," or "at least one of A or B" may represent all of the cases of (1) inclusion of at least one A, (2) inclusion of at least one B, and (3) inclusion of at least one A and at least one B.

The term as used in the present disclosure, "first" or "second" may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is "operatively or communicatively coupled with/to" or "connected to" another component (for example, a second component), it should be understood that the one component is connected to the other component directly or through any other component (for example, a third component). On the other hand, when it is said that a component (for example, a first component) is "directly connected to" or "directly coupled to" another component (for example, a second component), it may be understood that there is no other component (for example, a third component) between the components.

The term "configured to" as used herein may be replaced with, for example, the term "suitable for" "having the capacity to," "designed to," "adapted to," "made to," or "capable of" under circumstances. The term "configured to" may not necessarily mean "specifically designed to" in hardware. Instead, the term "configured to" may mean that a device may mean "capable of" with another device or part. For example, "a processor configured to execute A, B, and C" may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may be at least one of, for example, a smart phone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, a mobile medical equipment, a camera, or an wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), an attached type (for example, a skin pad or a tattoo), or an implantable type (for example, an implantable circuit).

According to some embodiments, an electronic device may be a home appliance. For example, the home appliance may be at least one of a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may be at least one of furniture, part of a building/structure, an electronic board, an electronic signature receiving device, a projector, and various measuring devices (for example, water, electricity, gas or electromagnetic wave measuring devices). According to various embodiments, an electronic device may be one or a combination of two or more of the foregoing devices. According to some embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments will be described below. In the present disclosure, the term 'user' may refer to a person or device (for example, artificial intelligence electronic device) that uses an electronic device.

Referring to FIG. 1, an electronic device 101 in a network environment 100 according to one embodiment of the present disclosure is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101.

The bus 110 may include a circuit that interconnects, for example, the foregoing components 120, 130, 150, 160, and 170 and allows communication (for example, control messages and/or data) between the foregoing components.

The processor 120 may include one or more of a CPU, an AP, or a communication processor (CP). The processor 120 may, for example, execute computation or data processing related to control and/or communication of at least one other component of the electronic device 101. The processor 120 may be called a controller. The processor 120 may incorporate the controller as its part, or form the controller. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The memory 130 may include a volatile memory and/or a non-volatile memory. The memory 130 may, for example, store instructions or data related to at least one other component of the electronic device 101. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs (for example, the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is, for example, an interface for the applications 147 to control functions that the kernel 141 or the middleware 143 provides. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication interface 170 may establish communication, for example, between the electronic device 101 and an external device (for example, a first external electronic device 102, a second external electronic device 104, or a server 106). For example, the communication interface 170 may be connected to a network 162 by wireless communication or wired communication, and communicate with the external device (for example, the second external electronic device 104 or the server 106) over the network 162. The communication interface 170 may include a CP, and the CP may be one of a plurality of modules in the communication interface 170. In an embodiment, the CP may be included in the processor 120.

The wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. Also, the wireless communication may include, for example, short-range communication 164. The short-range communication 164 may be conducted by, for example, at least one of wireless fidelity (WiFi), Bluetooth, near field communication (NFC), or GNSS. GNSS may include, for example, at least one of global positioning system (GPS), global navigation satellite system (Glonass), Beidou navigation satellite system (hereinafter, referred to as 'Beidou'), or Galileo, the European global satellite-based navigation system, according to an area using the GNSS or a used bandwidth. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a communication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (for example, the first and second external electronic devices 102 and 104) or the server 106. According to an embodiment, if the electronic device 101 is to perform a function or a service automatically or upon request, the electronic device 101 may request at least a part of functions related to the function or the service to another device (for example, the first or second external electronic device 102 or 104 or the server 106), instead of performing the function or the service autonomously, or additionally. The other electronic device (for example, the first or second external electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
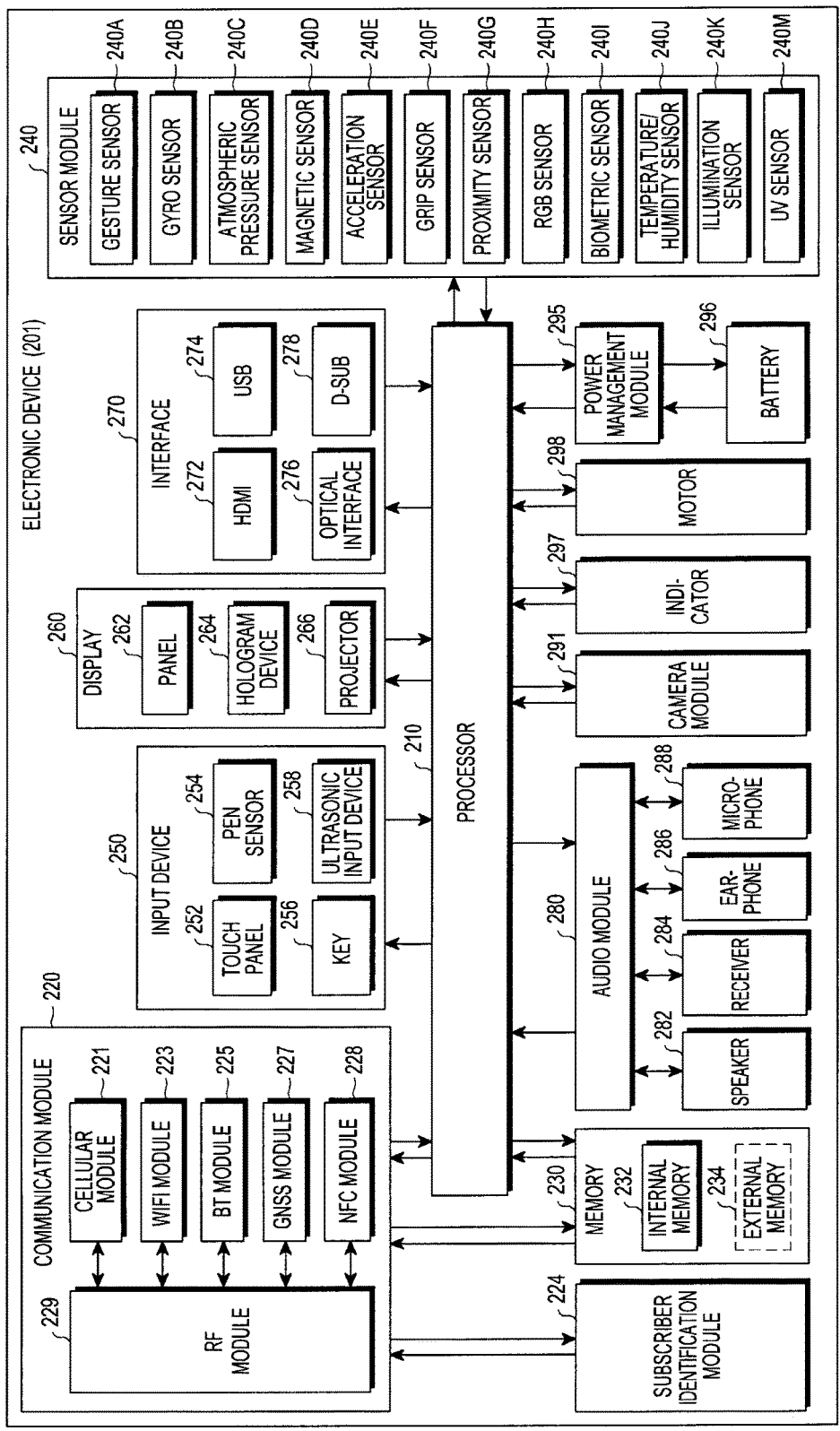
FIG. 2 is a block diagram of an electronic device according to one embodiment of the present disclosure.

FIG. 2 is a block diagram of an electronic device 201 according to one embodiment of the present disclosure. The electronic device 201 may include, for example, the whole or part of the electronic device 101 illustrated in FIG. 1. The electronic device 201 may include at least one processor (for example, AP) 210, a communication module 220, a memory 230, a sensor module 240, an input device 250, and a display 260. The electronic device 201 may further include at least one of a subscriber identification module (SIM) 224, an interface 270, an audio module 280, a camera module 291, a power management module 295, a battery 296, an indicator 297, and a motor 298.

The processor 210 may, for example, control a plurality of hardware or software components that are connected to the processor 210 by executing an OS or an application program, and may perform processing or computation of various types of data. The processor 210 may be implemented, for example, as a system on chip (SoC). According to an embodiment, the processor 210 may further include a graphics processing unit (GPU) and/or an image signal processor. The processor 210 may include at least a part (for example, a cellular module 221) of the components illustrated in FIG. 2. The processor 210 may load a command or data received from at least one of other components (for example, a non-volatile memory), process the loaded command or data, and store various types of data in the non-volatile memory.

The communication module 220 may have the same configuration as or a similar configuration to the communication interface 170 illustrated in FIG. 1. The communication module 220 may include at least one of, for example, the cellular module 221, a WiFi module 223, a Bluetooth (BT) module 225, a GNSS module 227 (for example, a GPS module, a Glonass module, a Beidou module, or a Galileo module), an NFC module 228, and a radio frequency (RF) module 229.

The cellular module 221 may provide services such as voice call, video call, text service, or the Internet service, for example, through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP.

Each of the WiFi module 223, the BT module 225, the GNSS module 227, and the NFC module 228 may include, for example, a processor that processes data received or transmitted by the module. According to an embodiment, at least a part (for example, two or more) of the cellular module 221, the WiFi module 223, the BT module 225, the GNSS module 227, or the NFC module 228 may be included in a single integrated chip (IC) or IC package.

The RF module 229 may transmit and receive, for example, communication signals (for example, RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD).

The external memory 234 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephaloeram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252. The input device 250 may further include at least one of a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262. The display 260 may further include a hologram device 264, and/or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include at least one of, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp).

The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. While not shown, the electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO™.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

Figure 3:
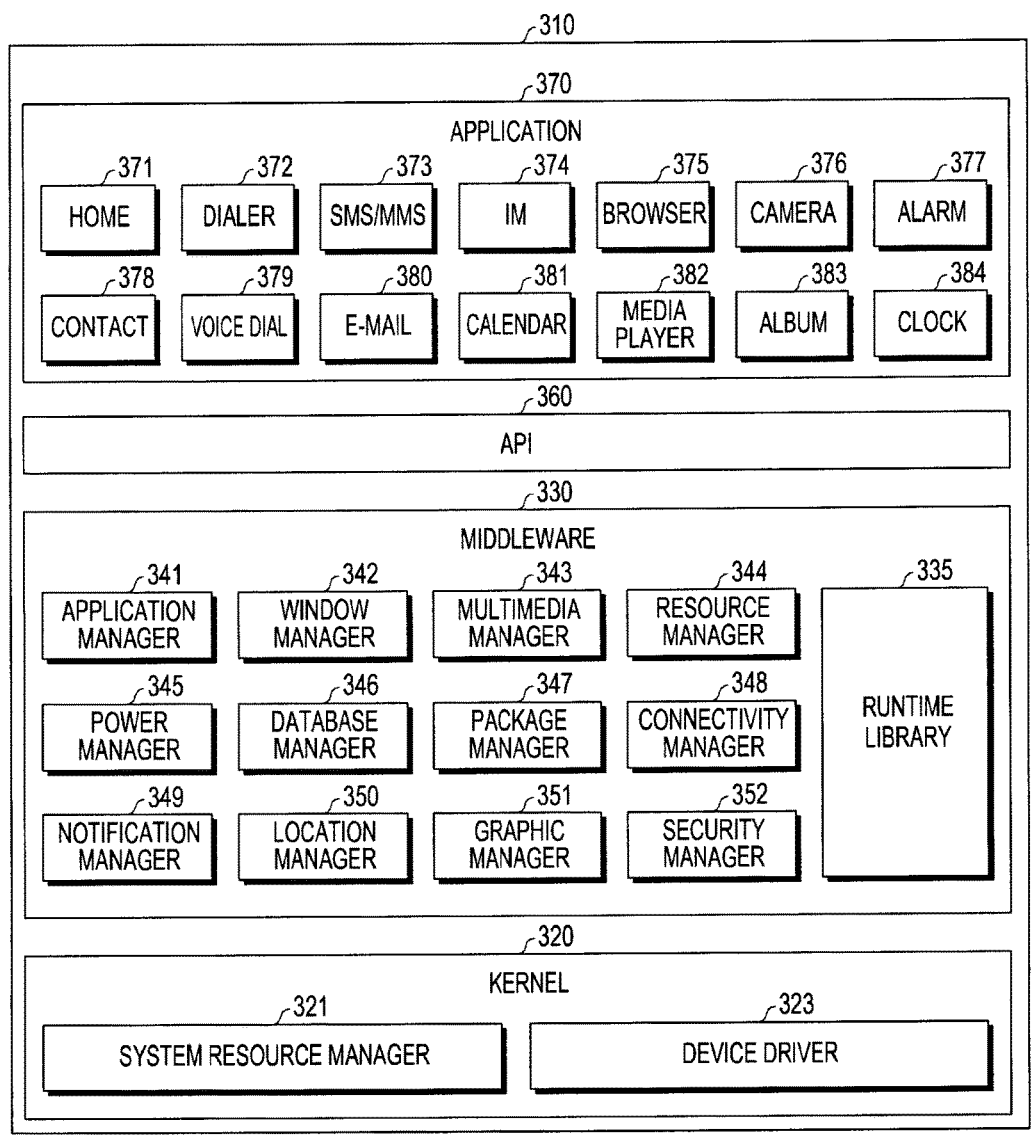
FIG. 3 is a block diagram of a programming module according to one embodiment of the present disclosure.

FIG. 3 is a block diagram of a programming module according to one embodiment of the present disclosure. According to an embodiment, a programming module 310 (for example, a program 140) may include an OS that controls resources related to an electronic device (for example, the electronic device 101) and/or various applications executed on the OS (for example, the application programs 147). For example, the OS may be Android, iOS, Windows, Symbian, Tizen, Bada, or the like.

The programming module 310 may include a kernel 320, middleware 330, an Application Programming Interface (API) 360, and/or applications 370. At least a part of the programming module 310 may be preloaded on the electronic device or downloaded from an external electronic device (for example, the first or second external electronic device 102 or 104, or the server 106).

The kernel 320 (for example, the kernel 141) may include, for example, a system resource manager 321 and/or a device driver 323. The system resource manager 321 may control, allocate, or deallocate system resources. According to an embodiment, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS) and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, Bluetooth, or the like. The notification manager 349 may display or notify an event such as message arrival, a schedule, a proximity notification, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. In an embodiment, if the electronic device (for example, the electronic device 101) has a telephony function, the middleware 330 may further include a telephony manager to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component.

The API 360 (for example, the API 145) is, for example, a set of API programming functions, which may be configured differently according to an OS. For example, in the case of Android or iOS, one API set may be provided per platform, whereas in the case of Tizen, two or more API sets may be provided per platform.

The applications 370 (for example, the application programs 147) may include, for example, one or more applications capable of executing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (for example, measurement of an exercise amount or a glucose level), or providing of environment information (for example, information about atmospheric pressure, humidity, or temperature).

According to an embodiment, the applications 370 may include an application (for the convenience of description, referred to as 'information exchange application') supporting information exchange between the electronic device (for example, the electronic device 101) and an external electronic device (the first or second external electronic device 102 or 104). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the first or second external electronic device 102 or 104). Also, the notification relay application may, for example, receive notification information from the external electronic device and transmit the received notification information to a user.

The device management application may, for example, manage (for example, install, delete, or update) at least a part of functions of the external electronic device (for example, the first or second external electronic device 102 or 104) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 370 may include (an application (for example, a health care application of a mobile medical equipment) designated according to) a property of the external electronic device (for example, the first or second external electronic device 102 or 104). According to an embodiment, the applications 370 may include an application received from an external electronic device (for example, the server 106 or the first or second external electronic device 102 or 104). According to an embodiment, the applications 370 may include a preloaded application or a third party application downloadable from a server. The names of components of the programming module 310 according to the embodiment of the present disclosure may vary according to the type of an OS.

According to various embodiments, at least a part of the programming module 310 may be implemented in software, firmware, hardware, or a combination of at least two of them. At least a part of the programming module 310 may be implemented (for example, executed) by the processor (for example, the processor 210). At least a part of the programming module 310 may include, for example, a module, a program, a routine, a set of instructions, or a process to execute one or more functions.

Figure 4:
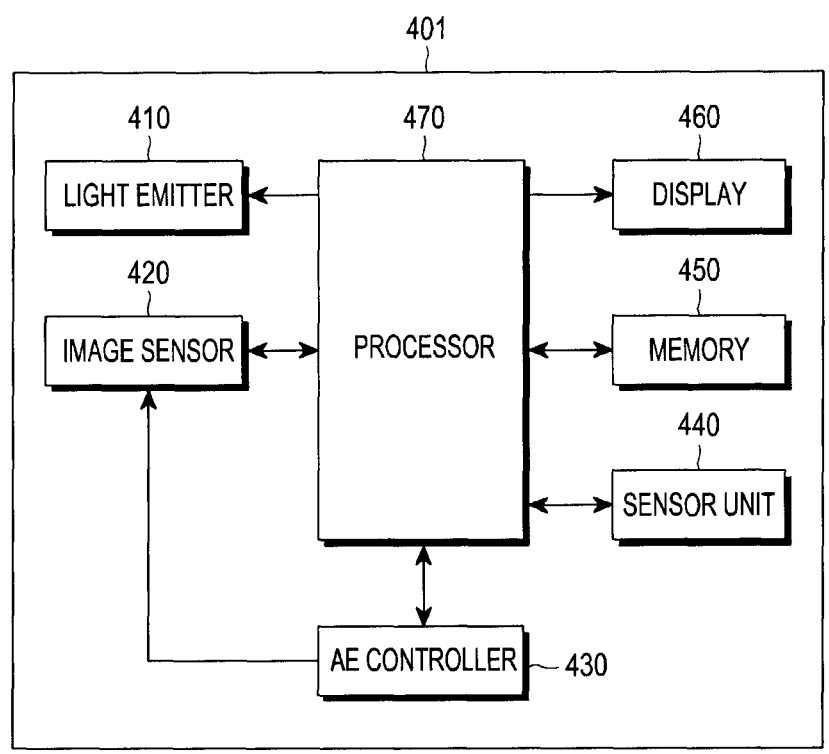
FIG. 4 is a block diagram of an electronic device according to one embodiment of the present disclosure.

FIG. 4 is a block diagram of an electronic device according to one embodiment of the present disclosure.

Referring to FIG. 4, the electronic device may include at least one of a light emitter 410, an image sensor 420, an auto exposure (AE) controller 430, a sensor unit 440, a memory 450, a display 460, and a processor 470. While only components related to embodiments of the present disclosure are illustrated in FIG. 4, the electronic device may further include other components. For example, the electronic device illustrated in FIG. 4 may include the whole or part of the electronic device 101 illustrated in FIG. 1 or the electronic device 201 illustrated in FIG. 2.

The light emitter 410 may project light onto an object during low-illuminance photographing. The light emitter 410 may control the amount of light, that is, the intensity of light projected onto the object under the control of the processor 470 or the AE controller 430. According to an embodiment, the light emitter 410 may include a flash.

According to an embodiment, the light emitter 410 may adaptively control light emission amounts for a main object (for example, a first object or a foreground) and a sub-object (for example, a second object or a background), respectively, under the control of the processor 470 or the AE controller 430. For example, the light emitter 410 may project light onto the main object for a short exposure time, and light onto the sub-object for a long exposure time. Short exposure and long exposure will be described later in detail with reference to (a) and (b) of FIG. 5.

Figure 5A:
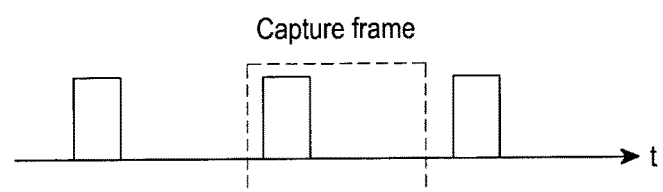
FIG. 5A and FIG. 5B are graphs illustrating short exposure and long exposure operations of a light emitter in an electronic device according to one embodiment of the present disclosure.
Figure 5B:
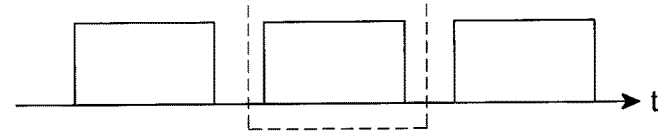

(a) and (b) of FIG. 5 are graphs illustrating a short-exposure operation and a long-exposure operation of a light emitter in an electronic device according to one embodiment of the present disclosure. In (a) and (b) of FIG. 5, the horizontal axis represents time, and the vertical axis represents the light intensity emitted from the light emitter 410. Accordingly, the rectangular area as shown in (a) and (b) of FIG. 5 may represent the amount of light emitted from the light emitter.

(a) of FIG. 5 is a graph illustrating an operation of the light emitter 410 that emits light adaptively according to the first object (or foreground) for a short exposure time under the control of the processor 470 or the AE controller 430.

(b) of FIG. 5 is a graph illustrating an operation of the light emitter 410 that emits light adaptively according to the second object (or background) for a long exposure time under the control of the processor 470 or the AE controller 430.

According to an embodiment, the electronic device 401 may acquire the short-exposed and long-exposed images of the first and second objects at the same time. For example, the electronic device 401 may simultaneously acquire short-exposed image data and long-exposed image data through the image sensor 420 having a plurality of first pixels controlled for the short exposure time for the first object, and a plurality of second pixels controlled for the long exposure time for the second object.

Referring to FIG. 4 again, the image sensor 420 may be an electronic sensor. When light reflected from an object is incident through a lens of the image sensor 420, the image sensor 420 may sense the incident light and output an electrical image signal corresponding to the sensed light. The image sensor 420 may output an image signal of a captured object on a frame-by-frame basis.

According to an embodiment, the image sensor 420 may be at least one of, for example, a complementary metal oxide semiconductor (CMOS) sensor, a charge coupled device (CCD) sensor, a Foveon sensor, or a complementary image sensor.

The image sensor 420 includes a plurality of pixels. To acquire an image of predetermined dimensions, the image sensor 420 may include an array of pixels arranged in rows and columns. According to an embodiment, the array may be divided into a plurality of first pixels and a plurality of second pixels. According to one embodiment of the present disclosure, the first pixels and the second pixels be arranged in various arrangements, such as one group of pixels, a pair of pixels, at least two adjacent pixels, and every other pixels. Hereinbelow, the plurality of first pixels and the plurality of second pixels may be referred to as a first group of pixels and a second group of pixels, respectively.

The first group of pixels may be initially configured to have the same exposure time as the second group of pixels. In this case, the AE controller 430 may change the configuration of the first group of pixels and the second group of pixels so that the first group of pixels and the second group of pixels have different exposure times, or change the exposure time of the first group of pixels and the second of group pixels by an equal time. Alternatively or additionally, the first group of pixels may be configured to have a different exposure time from the second group of pixels. In this case, the AE controller 430 may change the configuration of the first group of pixels and the second group of pixels so that the first group of pixels and the second group of pixels have the same exposure times, or change the exposure times of the first group of pixels and the second of group pixels by an equal time.

In the present disclosure, the state in which the first group of pixels and the second group of pixels have the same exposure time may be referred to as an AE mode, and the state in which the first group of pixels and the second group of pixels have different exposure times may be referred to as an HDR mode.

Further, the image sensor 420 may acquire image data based on a parameter related to exposure of a plurality of pixels.

According to an embodiment, the image sensor 420 may acquire image data based on a parameter for a plurality of pixels having different exposure in the HDR mode. For example, the image sensor 420 may output first image data based on the first group of pixels controlled according to a first parameter, and second image data based on the second group of pixels controlled according to a second parameter in the HDR mode. Each of the first parameter and the second parameter may include at least one of a different exposure time or a different exposure sensitivity. For example, the first parameter may include at least one of a first exposure time or a first exposure sensitivity, and the second parameter may include at least one of a second exposure time or a second exposure sensitivity. For example, the first exposure time may be a shorter exposure time than the second exposure time, and the second exposure time may be a longer exposure time than the first exposure time. The first parameter may correspond to the first object (or foreground), and the second parameter may correspond to the second object (or background).

In this way, the first image data and the second image data may be generated by differentiating at least one of the exposure or sensitivities of the first group of pixels and the second group of pixels for different objects (for example, the first object or foreground and the second object or background). For example, the first image data is short-exposed image data, which may be acquired with a light emission amount from the light emitter 410 that is adapted to the first object for a short exposure time. The second image data is long-exposed image data, which may be acquired with a light emission amount from the light emitter 410 that is adapted to the second object for a long exposure time. The short-exposed image data may be image data acquired through short exposure of the first group of pixels according to the first parameter (for example, at least one of the first exposure time or the first exposure sensitivity), and the long-exposed image data may be image data acquired through long exposure of the second group of pixels according to the second parameter (for example, at least one of the second exposure time or the second exposure sensitivity). A single HDR image may be generated by correcting and synthesizing the short-exposed image data and the long-exposed image data.

As described above, the light emitted from the light emitter 410 may set the exposure degrees of the first object and the second object, when the light emitter 410 is under the control of the processor 470 or the AE controller 430. That is, the exposure degrees of the first group of pixels and the second group of pixels in the image sensor 420 may be controlled by the processor 470 or the AE controller 430. In an embodiment of the present disclosure, the exposure degrees of the first group of pixels and the second group of pixels may be controlled according to at least one of an exposure time or an exposure sensitivity.

As explained above, the plurality of pixels in the image sensor 420 may be arranged in two different pixel groups such as the first group of pixels and the second group of pixels. A plurality of image data generated by the plurality of groups of pixels may be provided to the processor 470.

The AE controller 430 may control the image sensor 420 according to a predetermined exposure time. For example, the AE controller 430 may control a plurality of pixels of the image sensor 420 according to a predetermined short exposure time or long exposure time. For example, the AE controller 430 may control the image sensor 420 to acquire short-exposed image data (for example, the first image data) using the pixels selected as a short exposure group (for example, the first group of pixels) in the image sensor 420 by controlling the pixels for a predetermined short exposure time. Similarly, the AE controller 430 may control the image sensor 420 to acquire long-exposed image data (for example, the second image data) using the pixels selected as a long exposure group (for example, the second group of pixels) in the image sensor 420 by controlling the pixels for a predetermined long exposure time.

The sensor unit 440 may detect the brightness or distance of an object. For example, the sensor unit 440 may include at least one of a distance sensor, a depth sensor, a time of flight (TOF) sensor, a stereo camera, a structured light sensor, or an ultrasonic sensor.

The memory 450 may include an image buffer for storing an image formed based on image data acquired from the image sensor 420 on a frame-by-frame basis. Further, the memory 450 may store an AE table for setting a reference exposure time in the AE mode, and an HDR table for setting a long exposure time and a short exposure time in the HDR mode. For example, in the presence of an over-exposed area and an under-exposed area on a histogram, a related long exposure time and short exposure time may be extracted from the HDR table according to the histogram. Values listed in the tables may be, for example, averages of empirical values measured under various capturing environments, including default camera setting values, or may be set through an option menu by a user.

The display 460 may include the whole or part of the display 160 illustrated in FIG. 1. The display 460 may display a plurality of real-time image data acquired through the image sensor 420. The display 460 may also display an HDR image generated by synthesizing a long-exposed image acquired through the long exposure group of pixels and a short-exposed image acquired through the short exposure group of pixels.

The processor 470 may provide overall control to the electronic device 401. For example, the processor 470 may generate an HDR image by synthesizing a plurality of image data acquired through the image sensor 420. Generation of an HDR image will be described in detail with reference to FIGS. 6A, 6B, and 6C.

Figure 6A:
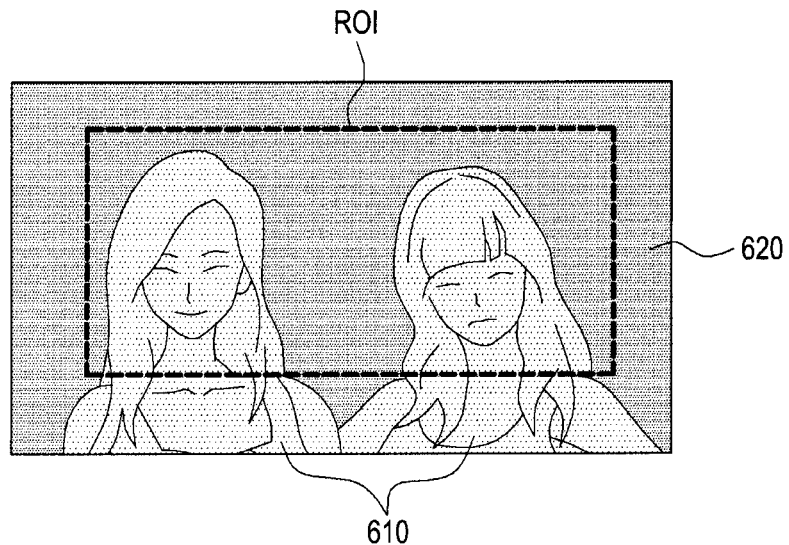
FIG. 6A, FIG. 6B, and FIG. 6C are exemplary views of high dynamic range (HDR) images captured through short exposure and long exposure according to one embodiment of the present disclosure.
Figure 6B:
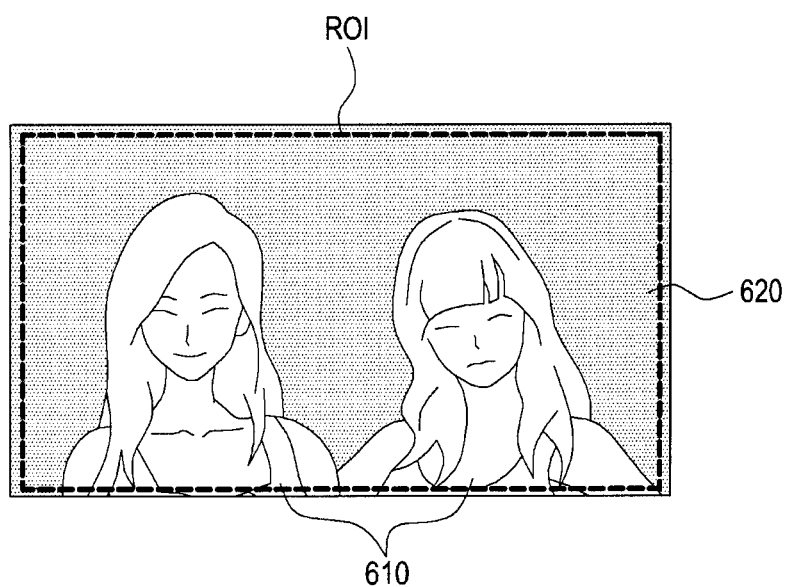
Figure 6C:
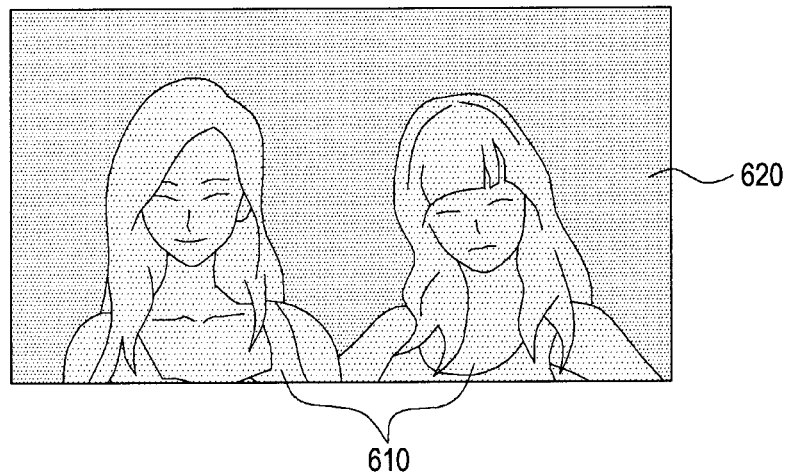

FIGS. 6A, 6B, and 6C are exemplary views illustrating HDR images acquired by short exposure and long exposure according to one embodiment of the present disclosure.

Referring to FIG. 6A, the processor 470 may acquire first image data through the first group of pixels of the image sensor 420 using a first parameter controlled by setting a region of interest (ROI) to a first object 610 and using light emitted from the light emitter 410. In this case, since exposure is adapted to the first object 610 (for example, a person or a foreground), a second object 620 (for example, a wall or a background) may be relatively insufficiently exposed.

Referring to FIG. 6B, the processor 470 may acquire second image data through the second group of pixels of the image sensor 420 using a second parameter controlled by setting the ROI to the second object 620 and using light emitted from the light emitter 410. In this case, since exposure is adapted to the second object 620 (for example, the wall or background), the exposure of the second object 620 is controlled so that the second object 620 may be brighter in the second image data than in the first image data. Also, the first object 610 may be brighter in the second image data than in the first image data, which means that exposure may be excessive for the first object 610 in the second image data.

Referring to FIG. 6C, HDR image data with proper exposure for the first object 610 and the second object 620 may be generated by interpolating and synthesizing the first image data and the second image data. For example, the electronic device 401 may generate HDR image data with proper exposure for the first object 610 and the second object 620 by synthesizing an area corresponding to the first object 610 in the first image data with an area corresponding to the second object 620 in the second image data.

Referring to FIG. 4 again, the processor 470 may receive one image data with the same exposure time or exposure sensitivity from the image sensor 420 in the AE mode. Therefore, the processor 470 may not execute a reconstruction function and a dynamic range compression function in the AE mode.

On the other hand, when the processor 470 synthesizes a plurality of image data with different exposure times or exposure sensitivities in the HDR mode, the quality of a synthesized image, i.e. the HDR image, may be degraded due to problems such as data loss during synthesizing. In this context, the processor 470 may correct the plurality of image data with different exposure times or exposure sensitivities (for example, the first image data and the second image data), thereby preventing quality degradation.

For this purpose, before synthesizing the plurality of image data with different exposure times or exposure sensitivities, the processor 470 may perform a pre-processing such as correction on the plurality of image data received from the image sensor 420.

According to an embodiment, the pre-processing may include at least one of, for example, luminance data generation, bad pixel correction (BPC), reconstruction, and/or dynamic range compression (DRC). The reconstruction function may generate a long-exposed image and a short-exposed image using pixel values included in short-exposed image data (for example, the first image data) and long-exposed image data (for example, the second image data), and merge the long-exposed image with the short-exposed image through interpolation and synthesis. For example, the processor 470 may synthesize a first area corresponding to the first object in the first image data with a second area corresponding to the second object in the second image data.

Further, the processor 470 may receive a plurality of real-time image data captured by the image sensor 420, and process the received plurality of image data adaptively according to display features (for example, the size, image quality, and resolution) of the display 460 or another display unit. For example, the image processing may be a function such as gamma correction, interpolation, spatial change, image effect, image scaling, auto white balance (AWB), AE, or auto focus (AF). The processor may operate based on one of matrix metering, touch AE, central metering, and spot metering.

The processor 470 may be incorporated in an AP responsible for a camera function and multimedia functions for reliable execution and control of various additional functions such as a multimedia data reproduction function.

The processor 470 may determine parameters for setting a long exposure time, a short exposure time, and/or an exposure sensitivity as well as a reference exposure time for an object to be captured according to the property of the object, at least partially based on light output through the light emitter 410 during a pre-flash operation. For example, the processor 470 may determine whether to operate the light emitter 410 using the image sensor 420 or the sensor unit 440 including at least one sensor.

When light is projected onto an object by the light emitter 410 during pre-flash for low-illuminance photographing, the processor 470 may determine the property of the object by sensing light reflected from the object through the image sensor 420. The property of the object may include at least one of, for example, the distance and luminance of the object.

For example, if the luminance of the object is equal to or greater than a predetermined threshold, the processor 470 may determine not to operate the light emitter 410. If the luminance of the object is less than the predetermined threshold, the processor 470 may determine to operate the light emitter 410. According to an embodiment, the processor 470 may determine whether to operate the light emitter 410 according to the distance to the object. For example, if the distance to the object is equal to or greater than a predetermined threshold, the processor 470 may determine to operate the light emitter 410. If the distance to the object is less than the predetermined threshold, the processor 470 may determine not to operate the light emitter 410.

According to an embodiment, a flash parameter including at least one of an exposure time or an exposure sensitivity may be determined based on the luminance or distance of an object. For example, the processor 470 may determine a first parameter including at least one of a first exposure time or a first exposure sensitivity based on the luminance of the first object (for example, a person) positioned relatively in the front, sensed through the first group of pixels of the image sensor 420 during the pre-flash operation. The processor 470 may also determine a second parameter including at least one of a second exposure time or a second exposure sensitivity based on the luminance of the second object (for example, a wall or background) positioned relatively in the rear, sensed through the second group of pixels of the image sensor 420 during the pre-flash operation. The processor 470 may determine different values as the first and second parameters.

According to one embodiment, the processor 470 may determine a parameter including at least one of an exposure time or an exposure sensitivity based on the distance to an object sensed through the sensor unit 440 including at least one sensor (for example, at least one of a distance sensor, a depth sensor, a TOF sensor, a stereo camera, a structured light sensor, or an ultrasonic sensor). For example, the processor 470 may predict the luminance of the first object (for example, a person) based on distance information about the first object, positioned relatively in the front, sensed through a distance sensor. The processor 470 may determine a first parameter including at least one of a first exposure time or a first exposure sensitivity for the first group of pixels based on the luminance of the first object predicted based on the distance information about the sensed first object. The processor 470 may also determine a second parameter including at least one of a second exposure time or a second exposure sensitivity for the second group of pixels based on the luminance of the sensed second object (for example, a wall or background) predicted based on distance information about the second object. The processor 470 may determine different values as the first and second parameters.

The processor 470 may determine the presence or absence of a background, for example, through the pre-flash operation of the light emitter 410. According to an embodiment, the processor 470 may perform AE metering analysis on an object during the pre-flash operation. The operation for determining whether a background exists during the pre-flash operation of the light emitter 410 will be described with reference to FIGS. 7, 8A, and 8B.

Figure 7:
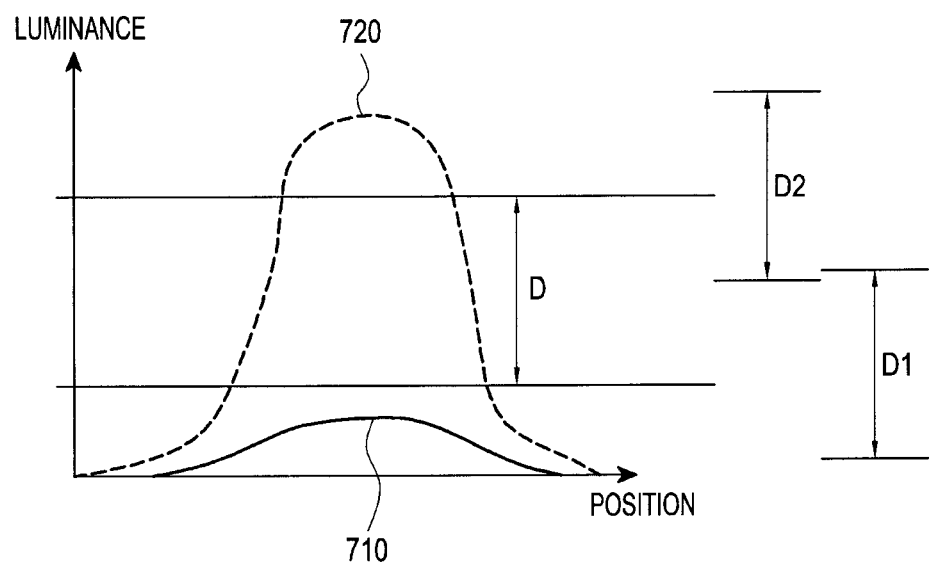
FIG. 7 is a graph illustrating the dynamic range of luminances of an object during a pre-flash operation of a light emitter in an electronic device according to one embodiment of the present disclosure.

FIG. 7 is a graph illustrating the dynamic range of luminances of an object during a pre-flash operation of a light emitter in an electronic device according to one embodiment of the present disclosure.

Referring to FIG. 7, a solid line represents the luminance 710 of a current object, and a dotted line represents the luminance 720 of the light emitter 410 in the AE mode. Conventionally, image data captured in the AE mode may have a dynamic range D. However, if the conventional dynamic range D is used in low-illuminance photographing, an object with a low luminance or a remote object may not be seen well due to lack of exposure. To avert this problem, the luminance of the light emitter 410 may be set differently to a higher value or lower value than a luminance available for photographing under a conventional photographing condition. For example, it may be configured that the luminance of the light emitter 410 has a dynamic range D2 in the case of first exposure (for example, short exposure), and the luminance of the light emitter 410 has a dynamic range D1 in the case of second exposure (for example, long exposure).

In this manner, the light emitter 410 may perform a pre-flash operation during low-illuminance photographing, and image data of an object may be acquired by setting two dynamic ranges during the pre-flash operation.

FIGS. 8A and 8B are exemplary views illustrating AE metering results of an electronic device according to one embodiment of the present invention. Numerals illustrated in FIGS. 8A and 8B represent the luminance values of pixels of the image sensor 420 within a metering area (for example, an ROI), when the image sensor 420 receives light reflected from objects during the pre-flash operation of the light emitter 410. For example, as a numeral is larger, it may imply that the luminance of a pixel corresponding to the numeral is greater.

As illustrated in FIG. 8A, for example, if the result of an AE metering analysis during the pre-flash indicates a luminance change in the metering area, the processor 470 may determine the presence of a foreground and a background. In this case, the processor 470 may acquire first image data during the pre-flash operation based on the pixel values of the first group of pixels controlled based on a first parameter including at least one of a first exposure time or a first exposure sensitivity determined based on the luminance of a first object (for example, a person or a foreground) positioned relatively in the front by pre-flash. The processor 470 may also acquire second image data during the pre-flash operation based on the pixel values of the second group of pixels controlled based on a second parameter including at least one of a second exposure time or a second exposure sensitivity determined based on the luminance of a second object (for example, a wall or background) positioned relatively in the rear by pre-flash.

Meanwhile, as illustrated in FIG. 8B, for example, if the result of the AE metering analysis during the pre-flash indicates no luminance change in the metering area, the processor 470 may determine the absence of a background. In this case, the processor 470 may output image data through the image sensor 420 only by means of a conventional shutter (for example, the AE mode).

According to an embodiment of the present disclosure, an area represented as relatively bright due to excessive exposure may be corrected using the short exposure group of pixels in the image sensor 420, and an area represented as relatively dark due to insufficient exposure may be corrected using the long exposure group of pixels in the image sensor 420.

For example, the processor 470 may acquire two image data captured during different exposure times, that is, short-exposed image data and long-exposed image data. The long-exposed image data captured may be dark on the whole due to under-exposure, and the short-exposed image data may be bright on the whole due to over-exposure. In this case, the AE controller 430 controls the long exposure time and the short exposure time based on the luminances of objects detected during the pre-flash operation of the light emitter or the distances of the objects detected through the sensor unit 440. Therefore, short-exposed image data and long-exposed data captured during the controlled short exposure time and the controlled long exposure time may be acquired. The short-exposed image data captured during the controlled short exposure time may be corrected in regard to over-exposure, and the long-exposed image data captured during the controlled long exposure time may be corrected in regard to under-exposure.

Since the long exposure group of pixels are exposed for a relatively long time and thus more light is incident on this group of pixels, relative to the short exposure group of pixels, the processor 470 may acquire an image with proper exposure using the long exposure group of pixels. Further, the processor 470 may correct an area that is relatively bright due to over-exposure using the short-exposure group of pixels. The processor 470 may correct the bright area by setting the exposure time of the short-exposure group of pixels to be shorter than when an image is captured in the AE mode.

The processor 470 may synthesize the long-exposed image data with the short-exposed image data, and the synthesized image may be viewed as an HDR image to the user. The HDR image may be generated by synthesizing the corrected short-exposed image with the corrected long-exposed image. As the luminance of an over-exposed part is reduced and the luminance of an under-exposed part is increased, image quality of the HDR image may be improved. Accordingly, an image with an extended dynamic range may be acquired.

Therefore, the processor 470 may generate one HDR image by interpolating and/or synthesizing the long-exposed image acquired through the long exposure group of pixels and the short-exposed image acquired through the short exposure group of pixels. Consequently, the processor 470 may display the HDR image with a dynamic range, acquired by synthesizing the first image data (for example, the short-exposed image) with the second image data (for example, the long-exposed image), on the display 460. As the HDR image, the image may have properly adjusted exposure, in which a background has its exposure adjusted for reducing the luminance of an over exposed part and an object has its exposure adjusted for increasing the luminance of an under-exposed part.

According to various embodiments, an electronic device may include a light emitter, an image sensor including a plurality of first pixels controlled based on a first parameter, and a plurality of second pixels controlled based on a second parameter, at least one sensor, and a processor. The processor may be configured to detect a first object and a second object among a plurality of objects in an image area, determine the first parameter based on a first property of the first object and the second parameter based on a second property of the second object, said determination is based at least in part on a light intensity that is outputted from the light emitter, reflected by the first object and the second object, and detected by the image sensor or the at least one sensor, acquire a first image of the first object according to the first parameter using the plurality of first pixels and a second image of the second object according to the second parameter using the plurality of second pixels; and synthesize a first area corresponding to the first object in the first image with a second area corresponding to the second object in the second image to generate an output image.

According to various embodiments, the first parameter includes at least one of a first exposure time or a first exposure sensitivity corresponding to the plurality of first pixels, and the second parameter includes at least one of a second exposure time or a second exposure sensitivity corresponding to the plurality of second pixels.

According to various embodiments, the first property includes a first luminance or a first distance of the first object, and the second property includes a second luminance or a second distance of the second object.

According to various embodiments, the processor may be configured to set a light intensity of the light emitter based on the first property or the second property.

According to various embodiments, when the first property or the second property is in a first range, the processor may be further configured to set a first light intensity of the light emitter, and when the first property or the second property is in a second range, the processor may be further configured to set a second light intensity of the light emitter.

According to various embodiments, when the first property or the second property is in a predetermined range, the processor may perform said determination, acquisition, and synthesis.

According to various embodiments, when the first property and the second property are not in the predetermined range, the processor may be further configured to acquire an image corresponding to the plurality of objects using the first pixels according to the first parameter and the second pixels according to the second parameter, using light from the light emitter set at a light intensity, without performing the determination, the acquisition, and the synthesis.

According to various embodiments, an electronic device may include a light emitter, an image sensor for acquiring image data through a plurality of first pixels and a plurality of second pixels, and a processor configured to identify a property of at least one object using light from the light emitter, determine a parameter for the at least one object based at least in part on the property, acquiring a plurality of image data corresponding to the at least one object through the first pixels and the second pixels, based on the determined parameter, and synthesizing the acquired plurality of image data to generate an output image.

According to various embodiments, the at least one object may include a first object and a second object, and the processor may be configured to identify a first property corresponding to the first object and a second property corresponding to the second object, using light emitted from a pre-flash operation of the light emitter.

According to various embodiments, the first property includes a first luminance of the first object, and the second property includes a second luminance of the second object.

According to various embodiments, the processor may be configured to determine a first parameter corresponding to the first property, acquire a first image data including a first area corresponding to the first object using the plurality of first pixels based on the determined first parameter, determine a second parameter corresponding to the second property, and acquire a second image data including a second area corresponding to the second object using the plurality of second pixels based on the determined second parameter.

According to various embodiments, when a luminance of the first area is less than a predetermined first threshold, the processor may be further configured to process the first image data by increasing the luminance of the first area to or above the first threshold, when a luminance of the second area is equal to or greater than a predetermined second threshold, the processor may further configured to process the second image data by decreasing the luminance of the second area to below the second threshold, and the processor may be further configured to generate an output image by merging the first image data with the second image data to include the first area with the luminance increased and the second area with the luminance decreased.

According to various embodiments, the electronic device may further include a distance sensor for detecting a distance between the image sensor and the at least one object. The first property may further include a first distance corresponding to the first object, and the second property may further include a second distance corresponding to the second object.

According to various embodiments, the distance sensor may include at least one of a time of flight (TOF) sensor, a stereo camera, or a structured light sensor.

According to various embodiments, when the first distance or the second distance is equal to or greater than a predetermined value, the processor may be further configured to acquire a third image data including the first area corresponding to the first object and the second area corresponding to the second object using the plurality of first pixels and the plurality of second pixels, based on a third parameter corresponding to a predetermined exposure condition.

Figure 9:
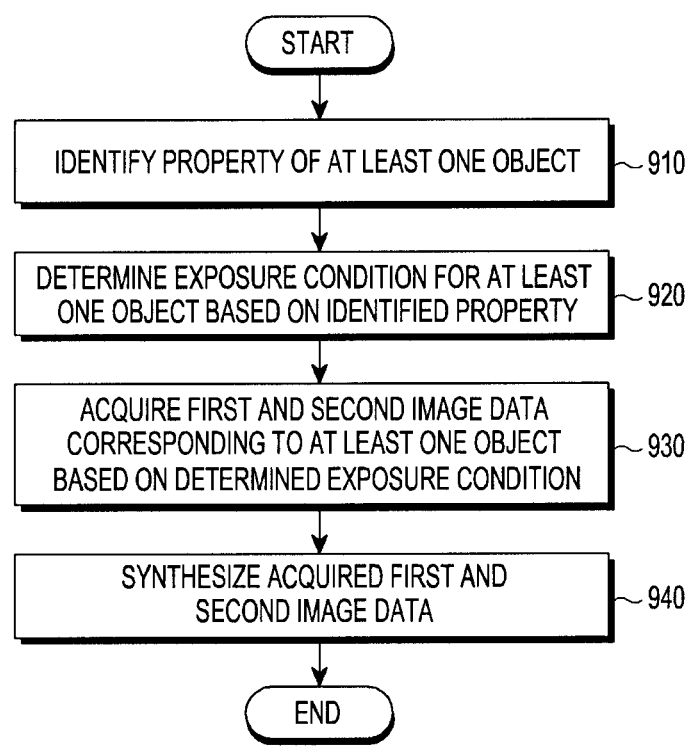
FIG. 9 is a flowchart illustrating a method for controlling an electronic device according to one embodiment of the present disclosure.

FIG. 9 is a flowchart illustrating a method for controlling an electronic device according to one embodiment of the present disclosure. The method for controlling an electronic device may include operations 910 to 940. The method for controlling an electronic device may be performed by at least one of an electronic device (for example, the electronic device 401) or the processor (for example, the processor 470) of the electronic device.

In operation 910, the electronic device may identify the property of at least one object. For example, the electronic device may identify a first property of a first object (for example, a person or foreground) and a second property of a second object (for example, a wall or a background) among a plurality of objects, by means of an image sensor or at least one sensor (for example, at least one of a distance sensor, a depth sensor, a TOF sensor, a stereo camera, a structured optical sensor, or an ultrasonic sensor).

According to an embodiment, the first property may include a first luminance or a first distance of the first object, and the second property may include a second luminance or a second distance of the second object.

In operation 920, for example, the electronic device may determine a parameter for the at least one object according to the identified property. For example, the electronic device may determine a first parameter according to the first property and a second parameter according to the second property, at least partially based on a light intensity that is outputted from the light emitter, reflected by the first object and the second object, and detected by the image sensor or the at least one sensor of the electronic device. The first and second parameters may be related respectively to exposure of the first and second objects. For example, the first parameter may include at least one of a first exposure time and a first exposure sensitivity corresponding to a plurality of first pixels (for example, a first group of pixels) of the image sensor, and the second parameter may include at least one of a second exposure time and a second exposure sensitivity corresponding to a plurality of second pixels (for example, a second group of pixels) of the image sensor. If the first or second property belongs to a first range, the electronic device may set a light intensity of the light emitter at a first light intensity, and if the first or second property belongs to a second range, the electronic device may set the light intensity at a second light intensity.

In operation 930, for example, the electronic device may acquire a plurality of image data corresponding to the at least one object based on the determined parameter. For example, the electronic device may acquire first image data according to the first parameter using the plurality of first pixels and second image data according to the second parameter using the plurality of second pixels, using light emitted from the light emitter at the set light intensity.

According to an embodiment, the first image data may be short-exposed image data, and the second image data may be long-exposed image data. The short-exposed image data may be image data acquired by shortening exposure of the first group of pixels using the first parameter (for example, at least one of the first exposure time or the first exposure sensitivity), and the long-exposed image data may be image data acquired by lengthening exposure of the second-group pixels using the second parameter (for example, at least one of the second exposure time or the second exposure sensitivity).

In operation 940, for example, the electronic device may synthesize the acquired plurality of image data to generate an output image. For example, the electronic device may generate an HDR image by synthesizing the first image data with the second image data. When synthesizing the first image data with the second image data, the electronic device may correct the first image data and the second image data having different exposure times or exposure sensitivities, thereby preventing degradation of image quality. For example, the electronic device may perform pre-processing to correct the plurality of image data before synthesizing the first image data with the second image data.

According to an embodiment, the pre-processing may include at least one of, for example, luminance data generation, BPC, reconstruction, and/or DRC. The reconstruction function may generate a long-exposed image and a short-exposed image using pixel values included in short-exposed image data (for example, the first image data) and long-exposed image data (for example, the second image data), and merge the long-exposed image with the short-exposed image through interpolation and synthesis. For example, the electronic device may synthesize a first area corresponding to the first object in the first image data with a second area corresponding to the second object in the second image data.

Figure 10:
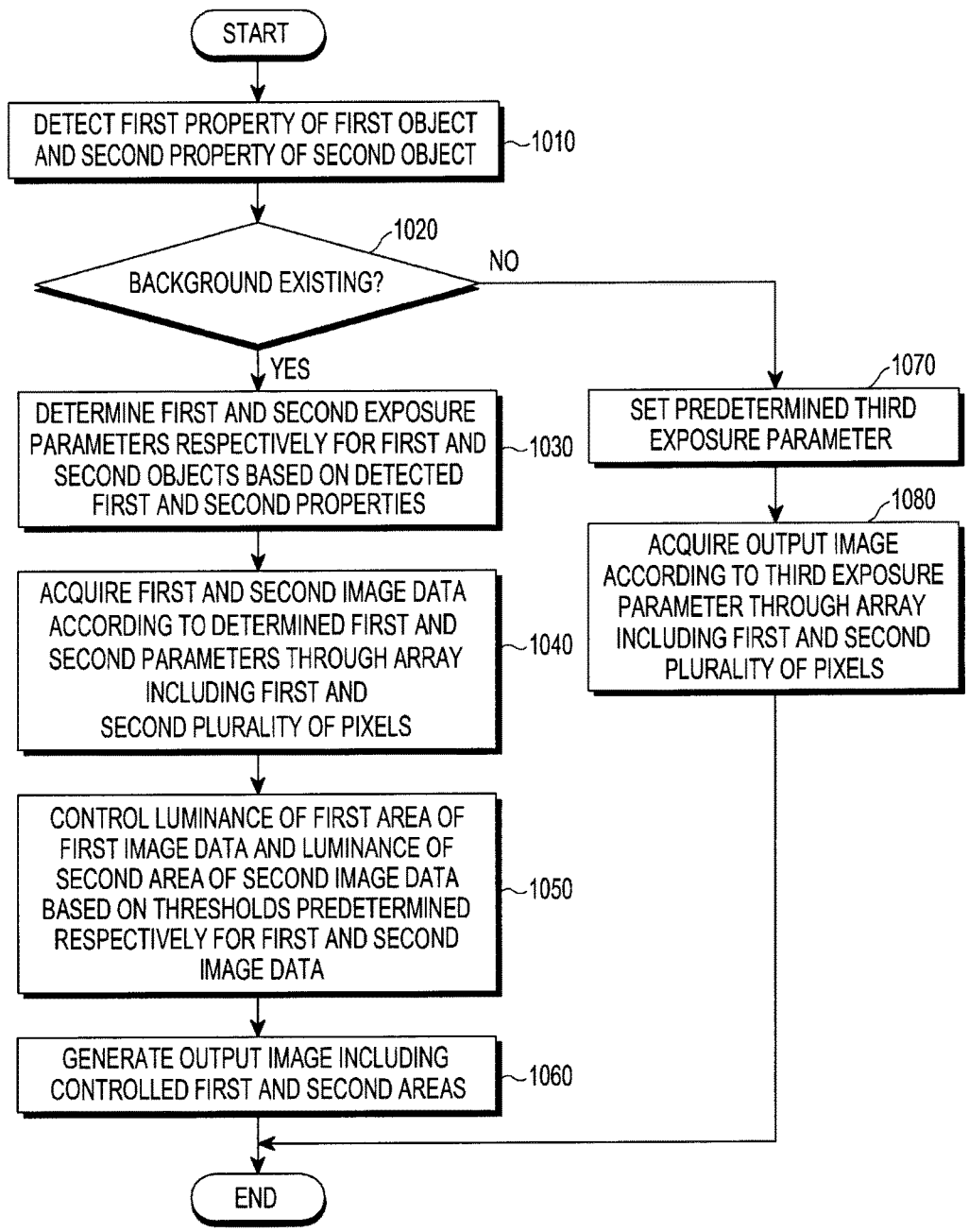
FIG. 10 is a flowchart illustrating a method for controlling an electronic device according to one embodiment of the present disclosure.

FIG. 10 is a flowchart illustrating a method for controlling an electronic device according to one embodiment of the present invention. The method for controlling the electronic device may include operations 1010 to 1080. The method for controlling electronic device may be performed by at least one of an electronic device (for example, the electronic device 401) or the processor (for example, the processor 470) of the electronic device.

In operation 1010, for example, the electronic device may detect a first property corresponding to a first object and a second property corresponding to a second object. For example, the electronic device may detect the first property of the first object (for example, a person or a foreground) and the second property of the second object (for example, a wall or a background), by means of an image sensor or at least one sensor (for example, at least one of a distance sensor, a depth sensor, a TOF sensor, a stereo camera, a structured optical sensor, or an ultrasonic sensor).

According to an embodiment, the first property may include a first luminance or a first distance of the first object, and the second property may include a second luminance or a second distance of the second object. If light with a set light intensity is projected onto the first and second objects during the pre-flash operation of a light emitter of the electronic device, the image sensor may detect the first luminance and the second luminance by sensing light reflected from the first object and the second object.

In operation 1020, for example, the electronic device may determine the presence or absence of a background for the plurality of objects to be captured by analyzing AE metering, as shown earlier in connection with FIGS. 7 and 8A-8B. In the presence of the background in operation 1020, the electronic device may perform operation 1030, and in the absence of the background in operation 1020, the electronic device may perform operation 1070.

According to an embodiment, if the result of an AE metering indicates a luminance change in a metering area (for example, an ROI), the electronic device may determine the presence of a foreground and a background. In this case, the electronic device may acquire image data based on parameters related to exposures of a plurality of pixels in the HDR mode.

According to an embodiment, if the result of the AE metering analysis indicates no luminance change in the metering area (for example, the ROI), the electronic device may determine the absence of the background. In this case, the electronic device may output image data through the image sensor only by means of a conventional shutter in the AE mode.

In operation 1030, for example, the electronic device may determine a first parameter for the first object and a second parameter for the second object based on the detected first and second properties. Operation 1030 is identical to operation 920 of FIG. 9 and thus will not be described in detail herein.

In operation 1040, for example, the electronic device may acquire first image data and second image data according to the determined first and second parameters through the image sensor including a plurality of first pixels (for example, a first group of pixels) and a plurality of second pixels (for example, a second group of pixels). Operation 1040 is identical to operation 930 of FIG. 9 and thus will not be described in detail herein.

In operation 1050, for example, the electronic device may control the luminance of a first area in the first image data and the luminance of a second area in the second image data, based on thresholds predetermined for the respective first and second image data.

According to an embodiment, if the luminance of the first area is equal to or greater than a predetermined first threshold, the electronic device may decrease the luminance of the first area to below the first threshold. If the luminance of the second area is less than a predetermined second threshold, the electronic device may increase the luminance of the second area to or above the second threshold.

In operation 1060, for example, the electronic device may generate output image data including the controlled first and second areas. For example, the electronic device may generate one HDR image data by synthesizing the first area with the luminance of the first object decreased with the second area with the luminance of the second object increased. Thus, the electronic device may generate HDR image data with proper exposure for over-exposed and under-exposed parts and with rich gradation by differentiating an exposure degree and thus decreasing the luminance of the over-exposed part and increasing the luminance of the under-exposed part in the acquired image data.

In operation 1070, for example, the electronic device may set a predetermined third parameter. The third parameter may be related to, for example, predetermined exposure for the AE mode. For example, the third parameter may include the same exposure time or the same exposure sensitivity for both the plurality of first pixels and second pixels.

In operation 1080, the electronic device may acquire an output image according to the predetermined third parameter through the image sensor. For example, the electronic device may output an image with the same exposure time or exposure sensitivity for the plurality of first and second pixels. In this case, image correction and synthesis may not be performed.

As is apparent from the foregoing description, according to various embodiments of the present disclosure, a low-illuminance image with proper exposure for both a foreground and a background can be acquired by synthesizing images with short exposure and long exposure captured simultaneously during low-illuminance photographing.

According to various embodiments, an HDR image with rich gradation can be acquired by acquiring images having different exposure such as short exposure and long exposure and synthesizing the images.

The term "module" as used herein may refer to a unit including one or a combination of two or more of hardware, software, and firmware. The term "module" may be used interchangeably with terms such as, for example, unit, logic, logical block, component, or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

According to various embodiments of the present disclosure, a storage medium may store instructions configured to, when executed by at least one processor, control the at least one processor to perform at least one operation. The at least one operation may include identifying a property of at least one object, using a light emitter of an electronic device, determining a parameter for the at least one object based at least in part on the property, acquiring a plurality of image data corresponding to the at least one object through an image sensor including a plurality of first pixels and a plurality of second pixels based on the determined parameter, and synthesizing the acquired plurality of image data to generate an output image.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

What is claimed is:

1. An electronic device comprising:
a light emitter;
an image sensor including a plurality of first pixels controlled based on a first exposure time, and a plurality of second pixels controlled based on a second exposure time;
at least one sensor; and
a processor,
wherein the processor is configured to:
identify a first object and a second object among a plurality of objects in an image area;
in response to a light outputted from the light emitter being projected on the first object and the second object, identify light intensity reflected from the first object and the second object using the image sensor or the at least one sensor;
identify the first exposure time based on a first property of the first object and the second exposure time based on a second property of the second object, wherein the identification of the first exposure time and the second exposure time is based at least in part on the light intensity, and a first value corresponding to the first property of the first object is different from a second value corresponding to the second property of the second object;

acquire a first image of the first object according to the identified first exposure time using the plurality of first pixels and a second image of the second object according to the identified second exposure time using the plurality of second pixels; and synthesize a first area corresponding to the first object in the first image with a second area corresponding to the second object in the second image to generate an output image.

2. The electronic device according to claim 1, wherein the first property includes a first luminance or a first distance of the first object, and the second property includes a second luminance or a second distance of the second object.

3. The electronic device according to claim 1, wherein the processor is further configured to set a light intensity of the light emitter based on the first property or the second property.

4. The electronic device according to claim 1, wherein when the first property or the second property is in a first range, the processor is further configured to set a first light intensity of the light emitter, and when the first property or the second property is in a second range, the processor is further configured to set a second light intensity of the light emitter.

5. The electronic device according to claim 1, wherein when the first property or the second property is in a predetermined range, the processor performs said identification, acquisition, and synthesis.

6. The electronic device according to claim 5, wherein when the first property and the second property are not in the predetermined range, the processor is further configured to acquire an image corresponding to the plurality of objects using the first pixels according to the identified first exposure time and the second pixels according to the identified second exposure time, using light from the light emitter set at a light intensity, without performing said identification, acquisition, and synthesis.

7. An electronic device comprising:
a light emitter;
an image sensor for acquiring image data using a plurality of first pixels and a plurality of second pixels; and
a processor configured to:
in response to a light outputted from the light emitter being projected on at least two objects in the image data, identify light intensity reflected from the at least two objects using the image sensor,
identify properties of the at least two objects using the light intensity, wherein each of the at least two objects has a different value corresponding to a different property,
identify a exposure time for the at least two objects based at least in part on the properties,
acquiring a plurality of image data corresponding to the at least two objects through the first pixels and the second pixels, based on the identified exposure time, and
synthesizing the acquired plurality of image data to generate an output image.

8. The electronic device according to claim 7, wherein the at least two objects include a first object and a second object, and
wherein the processor is further configured to identify a first property corresponding to the first object and a second property corresponding to the second object, using light emitted from a pre-flash operation of the light emitter.

9. The electronic device according to claim 8, wherein the first property includes a first luminance of the first object, and the second property includes a second luminance of the second object.

10. The electronic device according to claim 9, wherein the processor is further configured to:
identify a first exposure time corresponding to the first property,
acquire a first image data including a first area corresponding to the first object using the plurality of first pixels based on the identified first exposure time,
identify a second exposure time corresponding to the second property, and
acquire a second image data including a second area corresponding to the second object using the plurality of second pixels based on the identified second exposure time.

11. The electronic device according to claim 10, wherein
when a luminance of the first area is less than a predetermined first threshold, the processor is further configured to process the first image data by increasing the luminance of the first area to or above the first threshold,
when a luminance of the second area is equal to or greater than a predetermined second threshold, the processor is further configured to process the second image data by decreasing the luminance of the second area to below the second threshold, and
the processor is further configured to generate an output image by merging the first image data with the second image data to include the first area with the luminance increased and the second area with the luminance decreased.

12. The electronic device according to claim 10, further comprising a distance sensor for detecting distances between the image sensor and the at least two objects,
wherein the first property further includes a first distance corresponding to the first object, and the second property further includes a second distance corresponding to the second object.

13. The electronic device according to claim 12, wherein the distance sensor includes at least one of a time of flight (TOF) sensor, a stereo camera, or a structured light sensor.

14. The electronic device according to claim 12, wherein when the first distance or the second distance is equal to or greater than a predetermined value, the processor is further configured to acquire a third image data including the first area corresponding to the first object and the second area corresponding to the second object using the plurality of first pixels and the plurality of second pixels, based on a third exposure time corresponding to a predetermined exposure condition.

15. A method for controlling an electronic device, the method comprising:
in response to a light from a light emitter of the electronic device being projected on at least two objects in image data, identifying light intensity reflected from the at least two objects using an image sensor of the electronic device;
identifying properties of the at least two objects using the light intensity, wherein each of the at least two objects has a different value corresponding to a different property;
identifying a exposure time for the at least two objects based at least in part on the properties;
acquiring a plurality of image data corresponding to the at least two objects through an image sensor including a plurality of first pixels and a plurality of second pixels, based on the identified exposure time; and synthesizing the acquired plurality of image data to generate an output image.

16. The method according to claim 15, wherein the at least two objects include a first object and a second object, and wherein identifying the properties of the at least two objects comprises:

identifying a first property corresponding to the first object using light emitted from a pre-flash operation of the light emitter; and identifying a second property corresponding to the second object using light emitted from the pre-flash operation of the light emitter.

17. The method according to claim 16, wherein the first property includes a first luminance of the first object, and the second property includes a second luminance of the second object.

18. The method according to claim 17, wherein acquiring the plurality of image data corresponding to the at least two objects comprises:

acquiring a first image data including a first area corresponding to the first object using a plurality of first pixels of an image sensor of the electronic device based on a first exposure time corresponding to the first property; and acquiring a second image data including a second area corresponding to the second object using a plurality of second pixels of an image sensor of the electronic device based on a second exposure time corresponding to the second property.

19. The method according to claim 18, wherein synthesizing the acquired plurality of image data comprises:

when a luminance of the first area is less than a predetermined first threshold, processing the first image data by increasing the luminance of the first area to or above the first threshold;

when a luminance of the second area is equal to or greater than a predetermined second threshold, processing the second image data by decreasing the luminance of the second area to below the second threshold; and generating the output image by merging the first image data with the second image data to include the first area with the luminance increased and the second area with the luminance decreased.

* * * * *